(12) United States Patent
Cross

(10) Patent No.: US 6,894,878 B1
(45) Date of Patent: May 17, 2005

(54) DIFFERENTIAL GMR HEAD USING ANTI-PARALLEL PINNED LAYERS

(75) Inventor: Ralph W. Cross, Lyons, CO (US)

(73) Assignee: Maxtor Corporation, Longmont, CO (US)

( * ) Notice: Subject to any disclaimer, the term of this patent is extended or adjusted under 35 U.S.C. 154(b) by 87 days.

(21) Appl. No.: 10/342,918

(22) Filed: Jan. 14, 2003

Related U.S. Application Data
(60) Provisional application No. 60/394,986, filed on Jul. 10, 2002.

(51) Int. Cl.$^7$ .............................................. G11B 5/39
(52) U.S. Cl. .................................................. 360/314
(58) Field of Search ........................................ 360/314

(56) References Cited

U.S. PATENT DOCUMENTS

| | | | |
|---|---|---|---|
| 5,084,794 A | 1/1992 | Smith | 360/113 |
| RE33,949 E | 6/1992 | Mallary et al. | 360/110 |
| 5,442,508 A | 8/1995 | Smith | 360/113 |
| 5,627,703 A | 5/1997 | Smith | 360/113 |
| 5,828,525 A | 10/1998 | Iwasaki et al. | 360/113 |
| 6,141,191 A | 10/2000 | Lee et al. | 360/324.1 |
| 6,392,849 B2 * | 5/2002 | Maruyama et al. | 360/314 |
| 6,430,015 B2 | 8/2002 | Ju et al. | 360/327.32 |
| 6,643,103 B1 * | 11/2003 | Trindade | 360/314 |

\* cited by examiner

Primary Examiner—A. J. Heinz
(74) Attorney, Agent, or Firm—Robert G. Crouch; Marsh Fischmann & Breyfogle LLP

(57) ABSTRACT

A GMR read element with differential spin valves in which the free layers of the two spin valves have magnetization directions that are parallel to each other while the pinned layers most adjacent to the free layers have magnetization directions that are anti-parallel to each other. This can be achieved by having one of the spin valves be a synthetic spin valve and the other spin valve a non-synthetic spin valve. In this case, a single annealing process can set the magnetization directions of the pinned layers in this manner. It is also possible to use two synthetic spin valves in which one spin valve has an odd number of pinned layers and the other has an even number of pinned layers. The differential spin valves can be connected together in a parallel or a series relationship. It is possible for the differential sensor to be a two-, three-, or four-terminal device.

8 Claims, 8 Drawing Sheets

DIFFERENTIAL GMR HEAD USING ANTI-PARALLEL PINNED LAYERS

CROSS-REFERENCE TO RELATED APPLICATIONS

This application claims priority from U.S. Provisional Patent Application No. 60/394,986, filed Jul. 10, 2002, entitled "Two-Terminal Differential CIP GMR Head Using Anti-Parallel Pinned Layers", the contents of which are incorporated herein by reference.

FIELD OF THE INVENTION

This application relates to a magnetoresistive (MR) read element arrangement for data storage applications, particularly a differential giant magnetoresistive (GMR) read element arrangement.

BACKGROUND OF THE INVENTION

In hard disk drives, data is written to and read from magnetic recording media, herein called disks, utilizing magnetoresistive (MR) transducers commonly referred to as MR heads. Typically, one or more disks having a thin film of magnetic material coated thereon are rotatably mounted on a spindle. An MR head mounted on an actuator arm is positioned in close proximity to the disk surface to write data to and read data from the disk surface.

During operation of the disk drive, the actuator arm moves the MR head to the desired radial position on the surface of the rotating disk where the MR head electromagnetically writes data to the disk and senses magnetic field signal changes to read data from the disk. Usually, the MR head is integrally mounted in a carrier or support referred to as a slider. The slider generally serves to mechanically support the MR head and any electrical connections between the MR head and the disk drive. The slider is aerodynamically shaped, which allows it to fly over and maintain a uniform distance from the surface of the rotating disk.

Typically, an MR head includes an MR read element to read recorded data from the disk and an inductive write element to write the data to the disk. The read element includes a thin layer of magnetoresistive sensor stripe sandwiched between two magnetic shields that are electrically connected together but are otherwise isolated. A constant current is passed through the sensor stripe, and the resistance of the magnetoresistive stripe varies in response to a previously recorded magnetic pattern on the disk. In this way, a corresponding varying voltage is detected across the sensor stripe. The magnetic shields help the sensor stripe to focus on a narrow region of the magnetic medium, hence improving the spatial resolution of the read head.

Earlier MR sensors operated on the basis of the anisotropic magnetoresistive (AMR) effect in which a component of the read element resistance varied as the square of the cosine of the angle between the magnetization and the direction of sense current flowing through the read element. In this manner, because the magnetic field of the recording media would effect the magnetization direction within the read element, the change in resistance could be monitored to determine the type of external magnetic field applied by the magnetic recording medium. Most current disk drive products utilize a different, more pronounced magnetoresistive effect known as the GMR or spin valve effect. This effect utilizes a layered magnetic sensor that also has a change in resistance based on the application of an external magnetic field. While multiple layers are typically used, the most relevant layers are a pair of ferromagnetic layers separated by an electrically conductive non-magnetic spacer layer such as copper. One of the ferromagnetic layers known as the "free" layer is a soft magnetic material whose magnetization is changed by the external magnetic field caused by the close proximity of the magnetic recording medium. The other ferromagnetic layer, known as the "pinned" layer, is also a soft magnetic material that has its magnetization direction fixed by an adjacent layer known as the "pinning" layer. A layer of antiferromagnetic material is typically used as the pinning layer. A sense current is passed from one end of the ferromagnetic and conductive layers to the opposite end of those same layers. The resistance of this tri-layer structure is proportional to the cosine of the magnetization angle between the two ferromagnetic layers. Since one of the layers has a magnetization angle that is pinned and the other ferromagnetic layer has a magnetization that can vary in response to the magnetic field from an adjacent magnetic recording medium, the resistance of the tri-layer structure is a function of that magnetic field from the recording medium. It has been discovered that this tri-layer structure behaves in this manner because of a spin dependent scattering of electrons, the scattering being dependent on the spin of the electron and the magnetization direction of the layer through which the electron passes.

Competitive pressures within the computer industry require progressively increasing storage capacity within a given footprint for a disk drive. To provide this increased storage capacity, it is necessary to increase the areal density of data stored on the magnetic media. Of course, increasing areal density drives other constraints. It is necessary for the sensitivity or output of the read sensor to be increased in order to compensate for the smaller flux levels provided from the smaller area on the media where a given bit of data is recorded. Second, it is necessary for the read/write head to be able to write to and read from progressively smaller areas. For the read element, this means a narrower read gap.

For a GMR read element, the read gap is defined by the shield-to-shield spacing. Unfortunately, due to the finite thickness of the GMR film therebetween and the gap coverage on either side for electrical isolation, GMR read element designs appear to be approaching a hard limit of 45 to 50 nanometers. It is not at all clear how read gaps smaller than this can be designed for GMR read elements.

Perpendicular recording of data has been proposed to solve some of these issues. See U.S. Pat. No. RE 33,949, entitled "Vertical Magnetic Recording Arrangement", the contents of which are incorporated herein by reference. Perpendicular recording can both increase the area of density of recorded data and increase flux levels. One of the inherent characteristics of perpendicular recording, however, is that the read head always senses a magnetic field, as compared to longitudinal recording where the magnetic field is only sensed when the direction of magnetic recording changes. For this reason, perpendicular recording techniques proposed to date have differentiated the output from the read element. To date, differentiation has been performed electronically and has typically resulted in a loss of 3–5 dB SNR.

Differential GMR read elements have also been proposed. If problems relating to differential GMR readings could be solved, they could both help to enable perpendicular recording techniques in commercial products and decrease the effective read gap width. A differential GMR read element includes two different GMR read sensors located adjacent to each other. With their free layers separated by an insulation layer, the effective read gap width of the differential GMR read element is the distance from the magnetic center of one free layer to the magnetic center of the other free layer. As can be appreciated, this distance is much smaller than the shield-to-shield spacing. Unfortunately, all differential read elements proposed to date have suffered from various problems. In order to provide a differential output, the differential read elements of one prior art device were designed to have the magnetization direction of the adjacent free layers point in opposite directions. Unfortunately, this is difficult to do in practice.

As can be seen, there are many challenges that remain to be resolved before differential GMR sensors are commercially feasible. It is against this background and a desire to improve on the prior art that the present invention has been developed.

SUMMARY OF THE INVENTION

In view of the foregoing, a broad objective of the present invention is to provide a read element with a narrower effective read gap. Another objective of the present invention is to increase the sensitivity of GMR heads. A further objective is to provide a read element that addresses the problems of prior art differential GMR read elements.

In carrying out these and other objectives, features, and advantages of the present invention, a GMR read element for reading magnetically recorded data from adjacent magnetic storage media is provided. The read element includes a first spin valve having a conductive spacer layer, a free layer on one side thereof, and a pinned layer on an opposite side thereof. The read element also includes a second spin valve having a conductive spacer layer, a free layer on one side thereof, and a pinned layer on an opposite side thereof. The free layers of the first and second spin valves have magnetization directions in the absence of any magnetic field from the adjacent magnetic storage media that are parallel to each other, while the pinned layers of the first and second spin valves have magnetization directions that are anti-parallel to each other.

One of the first and second spin valves may be a synthetic spin valve. The other of the first and second spin valves may be a non-synthetic spin valve or a synthetic spin valve. In the case where both spin valves are synthetic spin valves, one of the synthetic spin valves may have an even number of pinned layers therein and the other of the synthetic spin valves may have an odd number of pinned layers therein.

The synthetic spin valve may include an antiferromagnetic ruthenium layer. The first and second spin valves may be electrically connected in parallel or in series with each other. Each of the first and second spin valves may have a resistance to electrical current that varies with magnetic fields from the adjacent magnetic storage media and wherein the resistances of the spin valves vary in opposite directions when both of the spin valves experience the same magnetic field from the adjacent magnetic storage media and the resistances vary in the same direction when the spin valves experience magnetic fields from the adjacent magnetic storage media that are of opposite direction.

A single annealing process may be used to set the directions of the pinned layers.

In another aspect of the present invention, a GMR read element for reading magnetically recorded data from adjacent magnetic storage media includes a first GMR read sensor having a free layer and having a resistance to electrical current that varies with magnetic fields from the adjacent magnetic storage media. The GMR read element also includes a second GMR read sensor having a free layer and having a resistance to electrical current that varies with magnetic fields from the adjacent magnetic storage media and an isolation layer located between the first and second GMR read sensors. The free layers of the first and second GMR read sensors have magnetization directions in the absence of any magnetic field from the adjacent magnetic storage media that are parallel to each other. The resistances of the first and second GMR read sensors vary in opposite directions when both of the sensors experience the same magnetic field from the adjacent magnetic storage media and the resistances vary in the same direction when the sensors experience magnetic fields from the adjacent magnetic storage media that are of opposite direction.

In another aspect of the present invention, a GMR read element for reading magnetically recorded data from adjacent magnetic storage media includes a first GMR read sensor having a conductive spacer layer, a free layer on one side thereof, and a pinned layer on an opposite side thereof and having a resistance to electrical current that varies with magnetic fields from the adjacent magnetic storage media. The GMR read element also includes a second GMR read sensor having a conductive spacer layer, a free layer on one side thereof, and a pinned layer on an opposite side thereof and having a resistance to electrical current that varies with magnetic fields from the adjacent magnetic storage media and an isolation layer located between the first and second GMR read sensors. The pinned layers of the first and second GMR read sensors have magnetization directions that are anti-parallel to each other. The resistances of the first and second GMR read sensors vary in opposite directions when both of the sensors experience the same magnetic field from the adjacent magnetic storage media and the resistances vary in the same direction when the sensors experience magnetic fields from the adjacent magnetic storage media that are of opposite direction.

In another aspect of the present invention, a GMR read element for reading magnetically recorded data from adjacent magnetic storage media includes a first GMR read sensor having a free layer and having a resistance to electrical current that varies with magnetic fields from the adjacent magnetic storage media. The GMR read element also includes a second GMR read sensor having a free layer and having a resistance to electrical current that varies with magnetic fields from the adjacent magnetic storage media and an isolation layer located between the first and second GMR read sensors. The free layers of the first and second GMR read sensors have magnetization directions in the absence of any magnetic field from the adjacent magnetic storage media that are parallel to each other. The GMR read sensors operate differentially.

Numerous additional features and advantages of the present invention will become apparent to those skilled in the art upon consideration of the further description that follows.

DETAILED DESCRIPTION OF THE PREFERRED EMBODIMENT

Reference will now be made to the accompanying drawings, which assist in illustrating the various pertinent features of the present invention. Although the present invention will now be described primarily in conjunction with disk drives, it should be expressly understood that the present invention might be applicable to other applications where differential reading with a magnetoresistive sensor is required/desired. In this regard, the following description of a GMR read element in a disk drive is presented for purposes of illustration and description. Furthermore, the description is not intended to limit the invention to the form disclosed herein. Consequently, variations and modifications commensurate with the following teachings, and skill and knowledge of the relevant art, are within the scope of the present invention. The embodiments described herein are further intended to explain best modes known of practicing the invention and to enable others skilled in the art to utilize the invention in such, or other embodiments and with various modifications required by the particular application(s) or use(s) of the present invention.

Figure 1:
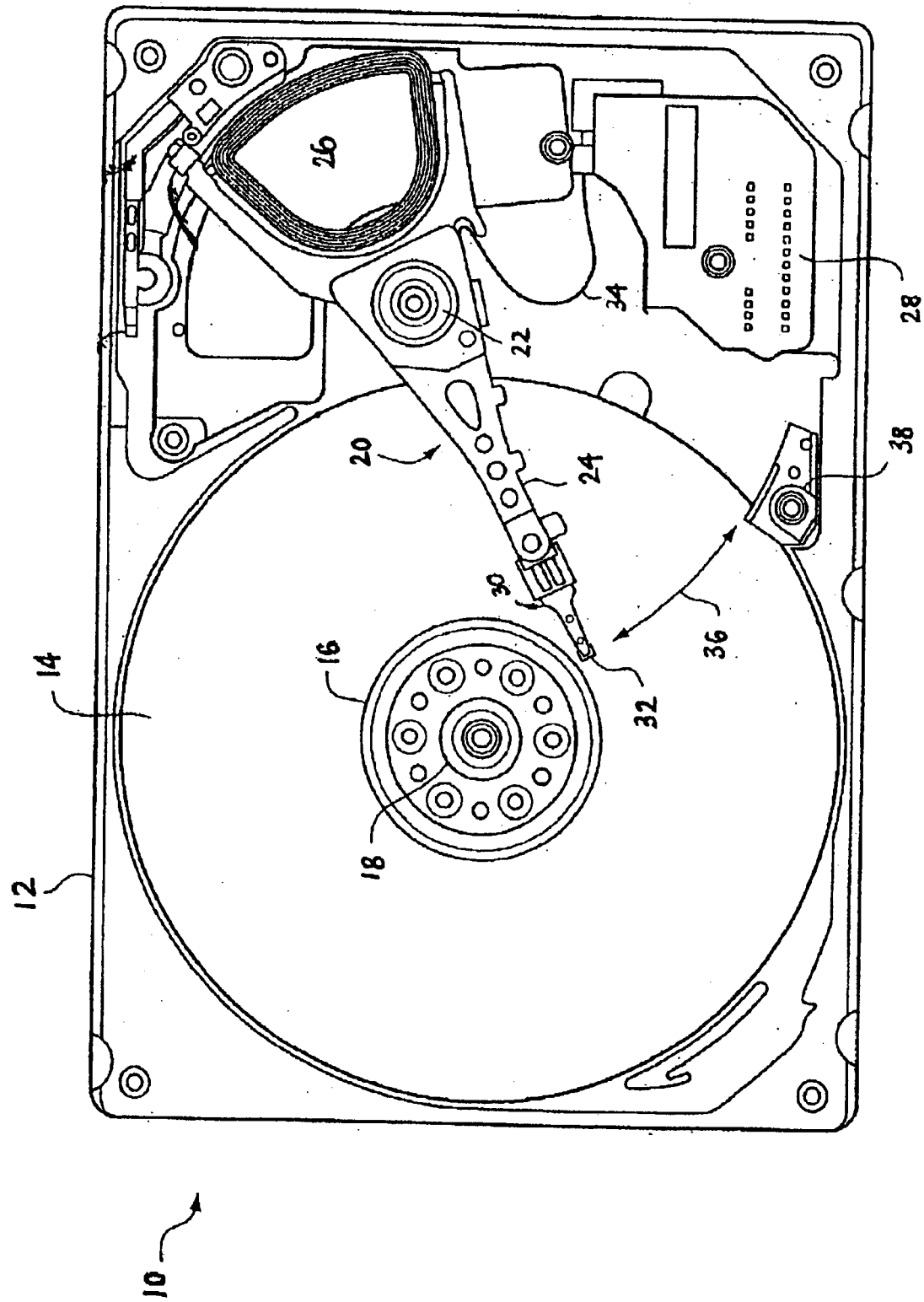
FIG. 1 is a top view of a disk drive that utilizes a head of the present invention.

FIG. 1 illustrates one embodiment of a disk drive 10. The disk drive 10 generally includes a base plate 12 and a cover (not shown) that may be disposed on the base plate 12 to define an enclosed housing or space for the various disk drive components. The disk drive 10 includes one or more data storage disks 14 of any appropriate computer-readable data storage media. Typically, both of the major surfaces of each data storage disk 14 include a plurality of concentrically disposed tracks for data storage purposes. Each disk 14 is mounted on a hub or spindle 16, which in turn is rotatably interconnected with the disk drive base plate 12 and/or cover. Multiple data storage disks 14 are typically mounted in vertically spaced and parallel relation on the spindle 16. Rotation of the disk(s) 14 is provided by a spindle motor 18 that is coupled to the spindle 16 to simultaneously spin the data storage disk(s) 14 at an appropriate rate.

The disk drive 10 also includes an actuator arm assembly 20 that pivots about a pivot bearing 22, which in turn is rotatably supported by the base plate 12 and/or cover. The actuator arm assembly 20 includes one or more individual rigid actuator arms 24 that extend out from near the pivot bearing 22. Multiple actuator arms 24 are typically disposed in vertically spaced relation, with one actuator arm 24 being provided for each major data storage surface of each data storage disk 14 of the disk drive 10. Other types of actuator arm assembly configurations could be utilized as well, such as an "E" block having one or more rigid actuator arm tips or the like that cantilever from a common structure. In any case, movement of the actuator arm assembly 20 is provided by an actuator arm drive assembly, such as a voice coil motor 26 or the like. The voice coil motor 26 is a magnetic assembly that controls the operation of the actuator arm assembly 20 under the direction of control electronics 28. Any appropriate actuator arm assembly drive type may be utilized by the disk drive 10, including a linear drive (for the case where the actuator arm assembly 20 is interconnected with the base plate 12 and/or cover for linear movement versus the illustrated pivoting movement about the pivot bearing 22) and other types of rotational drives.

A load beam or suspension 30 is attached to the free end of each actuator arm 24 and cantilevers therefrom. Typically, the suspension 30 is biased generally toward its corresponding disk 14 by a spring-like force. A slider 32 is disposed at or near the free end of each suspension 30. What is commonly referred to as the "head" (e.g., transducer) is appropriately mounted on the slider 32 and is used in disk drive read/write operations.

The head on the slider 32 may utilize various types of read/write technologies such as anisotropic magnetoresistive (AMR), giant magnetoresistive (GMR), and tunneling magnetoresistive (TuMR), other magnetoresistive technologies, or other suitable technologies. AMR is due to the anisotropic magnetoresistive effect with a normalized change in resistance ($\Delta R/R$) of 2–4%. GMR results from spin-dependent scattering mechanisms between two magnetic layers (or more). The typical use in recording heads is the spin valve device that uses a free layer to detect external fields, and a pinned magnetic layer. The normalized change in resistance is typically 8–12%, but can be as large as 15–20% when used with specular capping layers and spin-filter layers. TuMR is similar to GMR, but is due to spin dependent tunneling currents across an isolation layer. The typical embodiment includes a free layer and a pinned layer separated by an insulating layer of $Al_2O_3$ with the current flowing perpendicular to the film plane, producing normalized change in resistance of 12–25%. The term magnetoresistive is used in this application to refer to all these types of magnetoresistive sensors and any others in which a variation in resistance of the sensor due to the application of an external magnetic field is detected. The biasing forces exerted by the suspension 30 on its corresponding slider 32 thereby attempt to move the slider 32 in the direction of its corresponding disk 14. Typically, this biasing force is such that if the slider 32 were positioned over its corresponding disk 14, without the disk 14 being rotated at a sufficient velocity, the slider 32 would be in contact with the disk 14.

The head on the slider 32 is interconnected with the control electronics 28 of the disk drive 10 by a flex cable 34 that is typically mounted on the actuator arm assembly 20. Signals are exchanged between the head and its corresponding data storage disk 14 for disk drive read/write operations. In this regard, the voice coil motor 26 is utilized to pivot the actuator arm assembly 20 to simultaneously move the slider 32 along a path 36 and "across" the corresponding data storage disk 14 to position the head at the desired/required radial position on the disk 14 (i.e., at the approximate location of the correct track on the data storage disk 14) for disk drive read/write operations.

When the disk drive 10 is not in operation, the actuator arm assembly 20 is pivoted to a "parked position" to dispose each slider 32 generally at or beyond a perimeter of its corresponding data storage disk 14, but in any case in vertically spaced relation to its corresponding disk 14. This is commonly referred to in the art as being a dynamic load/unload disk drive configuration. In this regard, the disk drive 10 includes a ramp assembly 38 that is disposed beyond a perimeter of the data storage disk 14 to typically both move the corresponding slider 32 vertically away from its corresponding data storage disk 14 and to also exert somewhat of a retaining force on the actuator arm assembly 20. Any configuration for the ramp assembly 38 that provides the desired "parking" function may be utilized. The disk drive 10 could also be configured to be of the contact start/stop type, where the actuator arm assembly 20 would pivot in a direction to dispose the slider(s) 32 typically toward an inner, non-data storage region of the corresponding data storage disk 14. Terminating the rotation of the data storage disk(s) 14 in this type of disk drive configuration would then result in the slider(s) 32 actually establishing contact with or "landing" on their corresponding data storage disk 14, and the slider 32 would remain on the disk 14 until disk drive operations are re-initiated.

The slider 32 of the disk drive 10 may be configured to "fly" on an air bearing during rotation of its corresponding data storage disk(s) 14 at a sufficient velocity. The slider 32 may be disposed at a pitch angle such that its leading edge is disposed further from its corresponding data storage disk 14 than its trailing edge. The head would typically be incorporated on the slider 32 generally toward its trailing edge since this is positioned closest to its corresponding disk 14. Other pitch angles/orientations could also be utilized for flying the slider 32.

Figure 2:
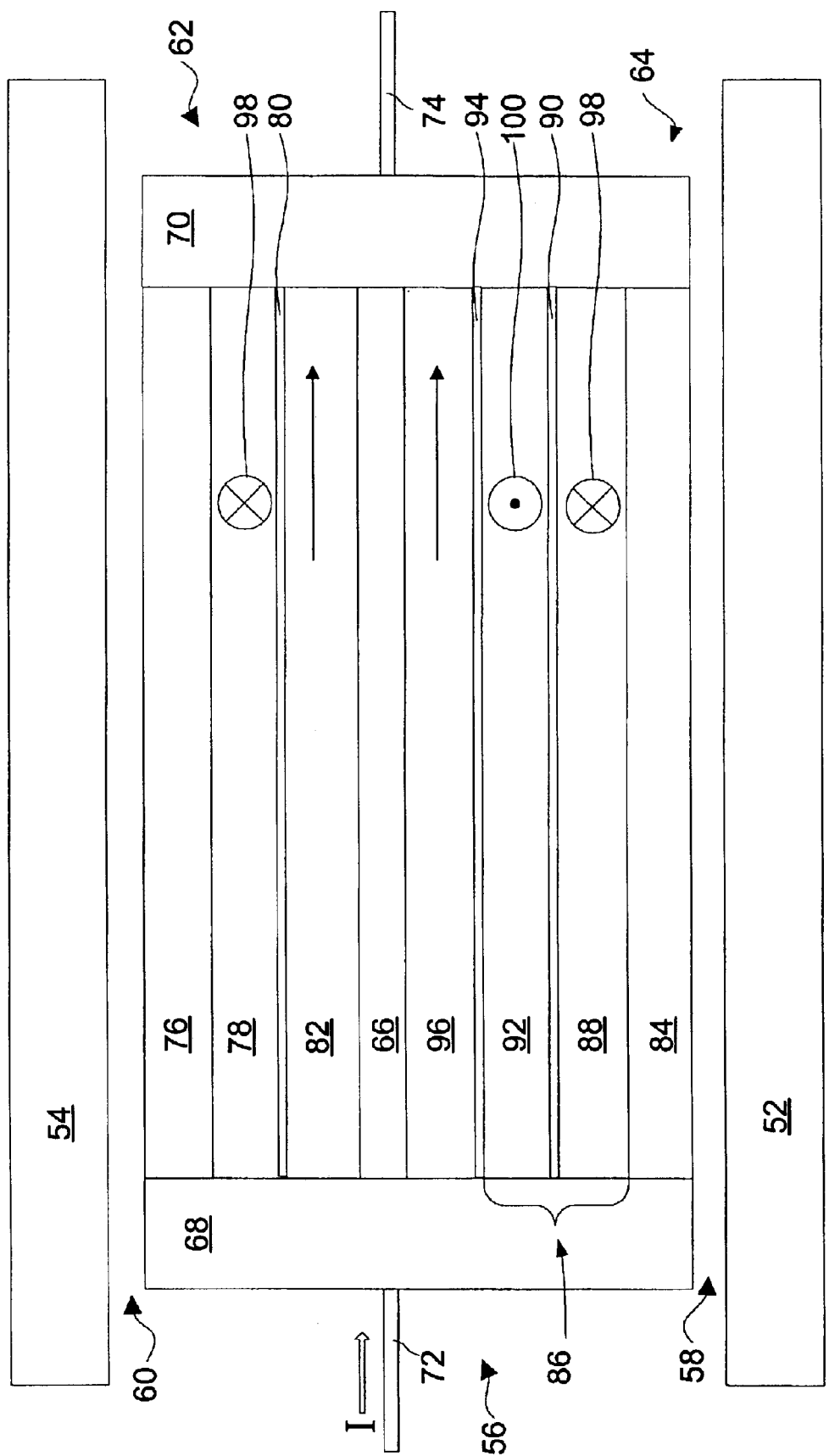
FIG. 2 is a schematic view of a differential GMR read element of the present invention, shown in a parallel arrangement.

FIG. 2 illustrates a read element 50 of the head on the slider 32. As can be seen, the read element 50 is a multi-layer element manufactured by depositing a series of thin film layers on top of each other. As illustrated and described herein, certain layers, such as most seed layers, conductors, and so forth, are omitted for ease of illustration and understanding. Instead, the most relevant layers are described herein. As can be seen, the read element 50 includes a bottom shield 52 and a top shield 54. A parallel, differential GMR sensor 56 is located between the shields 52 and 54, spaced apart therefrom by a first read gap 58 and a second read gap 60, respectively. The sensor 56 includes a top spin valve 62 and a bottom synthetic spin valve 64 that are separated from each other by an isolation layer 66. The sensor 56 also includes a pair of electrical connectors 68 and 70 that are located on opposite sides of the sensor 56. A pair of conductors 72 and 74 are electrically connected to the electrical connectors 68 and 70, respectively, to carry a current I to and from the sensor 56. Of course, the connectors 68 and 70 may typically be the permanent magnets and conductors that are used in an abutted junction design. This could include a single mill/deposition process through both spin valves, or a double layer (two permanent magnets) separated by a non-magnetic layer.

The top spin valve 62 includes a pinning layer 76 that may be composed of platinum manganese (PtMn). Adjacent to the pinning layer 76 is a pinned layer 78 that may be composed of cobalt iron (CoFe). Adjacent to the pinned layer 78 is a narrow conductive spacer layer 80 that may be composed of copper (Cu). Adjacent to the conductive spacer layer 80 is a free layer 82 that may be composed of CoFe. The isolation layer 66 should magnetically isolate the two spin valves 62 and 64 from each other. Tantalum (Ta) is a suitable material, although aluminum oxide ($Al_2O_3$) could be used as well.

The bottom synthetic spin valve 64 includes a pinning layer 84 that may be composed of PtMn. Adjacent to the pinning layer 84 is a synthetic pinned "layer" 86 that includes a first pinned layer 88, a thin antiferromagnetic layer 90 (e.g., 8 to 12 Angstroms thick) that is composed of a material such as ruthenium (Ru), and a second pinned layer 92. On top of the synthetic pinned "layer" 86 adjacent to the second pinned layer 92 is a conductive spacer layer 94 that may be composed of copper. Adjacent to the conductive spacer layer 94 is a free layer 96.

As is well known, the two pinned layers 88 and 92 of the synthetic pinned "layer" 86 of the bottom synthetic spin valve 64 will preferably have pinned magnetic directions that are anti-parallel to each other. A single annealing process that may be conducted at a temperature is of 240–280 C, and a magnetic field of 8–15 kOe, for 4–6 hours, may be used to anneal the pinning layers 76 and 84 in the two spin valves 62 and 64. In this manner, the pinned layer 78 of the top spin valve 62 and the first pinned layer 88 of the bottom synthetic spin valve 64 are caused to have pinned magnetic directions that are parallel to each other. In FIG. 2, these magnetic directions are shown to be into the paper as shown by the tail of the arrow 98 in those pinned layers 78 and 88. Because of the Ru antiferromagnetic layer 90, the second pinned layer 92 will then have a pinned magnetic direction in an opposite, anti-parallel direction as shown by the arrow tip 100 showing the magnetic direction being out of the paper in FIG. 2.

Figure 3:
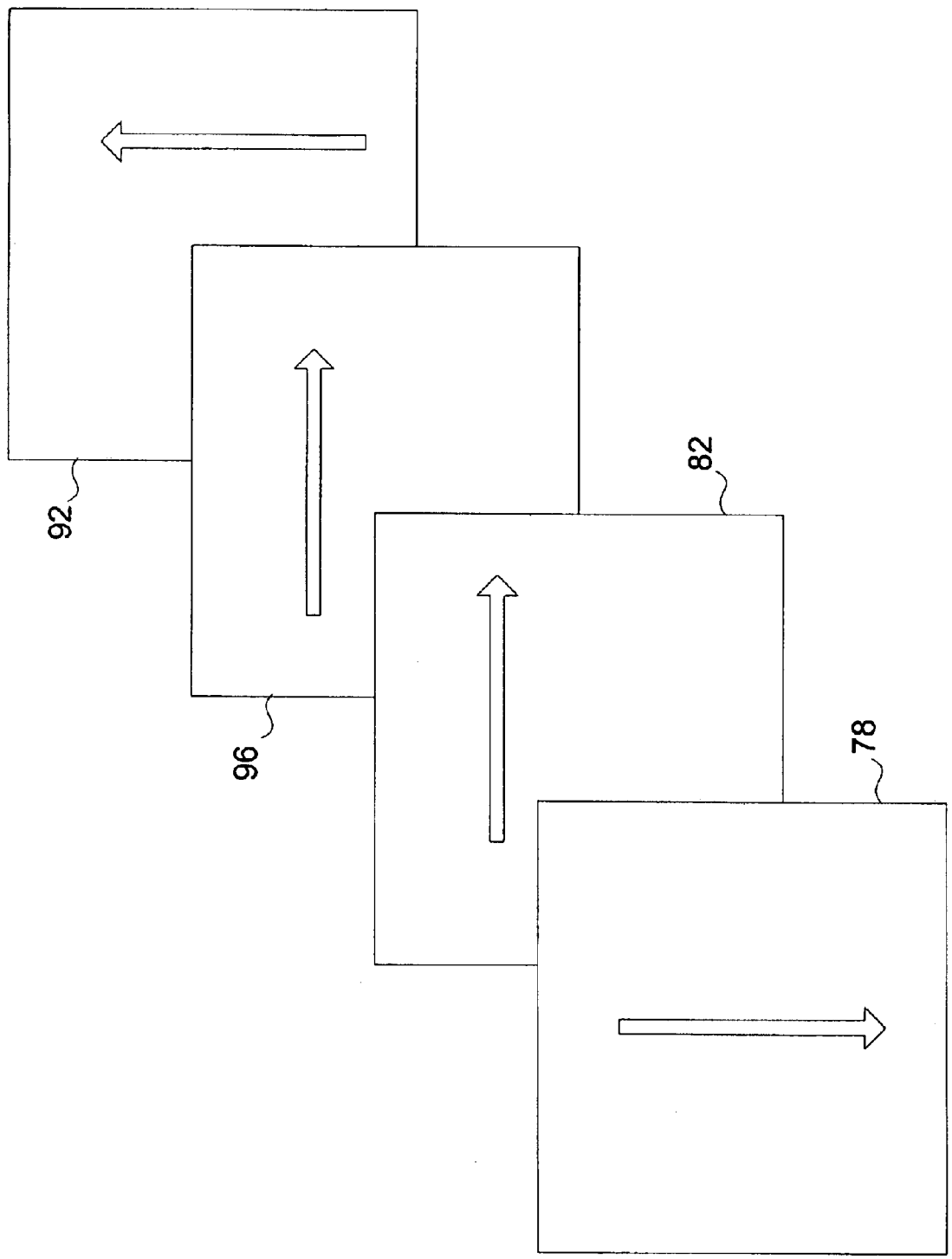
FIG. 3 is a schematic view of only the free layers and the next adjacent pinned layers in the differential GMR read element of FIG. 2.

In FIG. 3, only certain relevant portions of the read element 50 of FIG. 2 are illustrated. Specifically, the second pinned layer 92 and free layer 96 of the bottom synthetic spin valve 64 are shown and the free layer 82 and pinned layer 78 of the top spin valve 62 are shown. As was previously described, the magnetic directions of the free layers 82 and 96 are parallel to each other and the magnetic directions of the pinned layers 78 and 92 are anti-parallel to each other. Accordingly, it can be appreciated that when the same external magnetic field is applied to the two free layers 82 and 96, one will move to a direction that is closer to anti-parallel with its respective pinned layer, while the other will move to a direction that is closer to parallel with its respective pinned layer. As can be appreciated, this will cause the resistance in one of the spin valves to increase while the resistance of the other spin valve will decrease.

Figure 4:
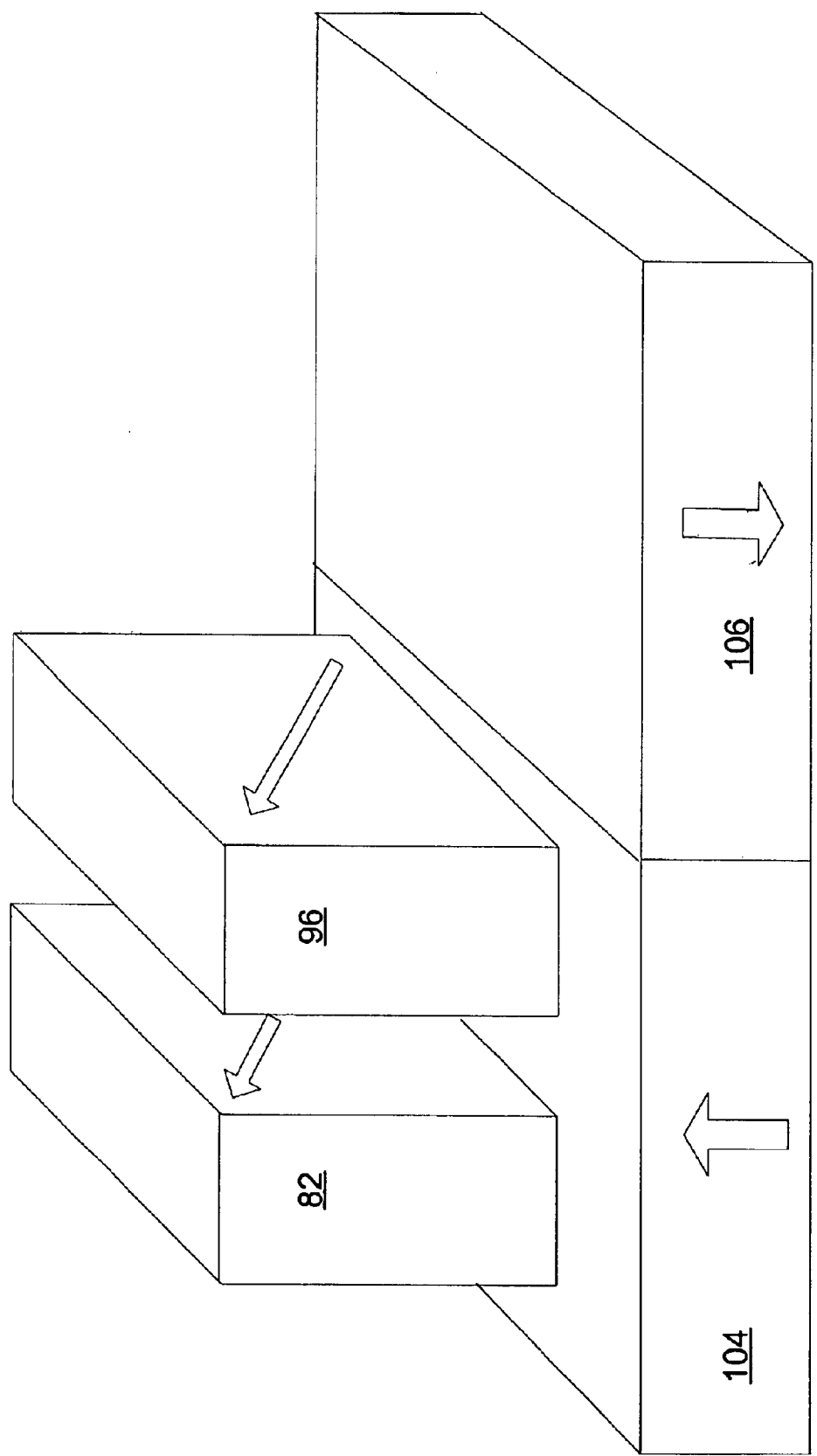
FIG. 4 is a schematic view of only the free layers of the differential GMR read element of FIG. 2, shown under the influence of a portion of a perpendicularly-recorded media in which the magnetic fields in the regions of each free layer are in the same direction.

This situation is better illustrated in FIG. 4 in which the two free layers 82 and 96 are shown adjacent to a portion of magnetically recorded media 102. In this case, two different sections of the magnetically recorded media 102 are shown to be perpendicularly recorded with an upwardly directed magnetic field in a first section 104 and a downwardly recorded magnetic field in a second section 106. In this case, each of the free layers 82 and 96 are adjacent to the first section 104 so that their magnetization directions are tilted upward as shown in FIG. 4. As explained above, this will cause the resistance of one of the spin valves to increase while the resistance of the other spin valve decreases. Because the two spin valves 62 and 64 are essentially connected together in an electrically parallel arrangement, as shown in FIG. 2, the parallel combined resistance of the two spin valves 62 and 64 and the GMR sensor 56 will vary only slightly, if at all.

Figure 5:
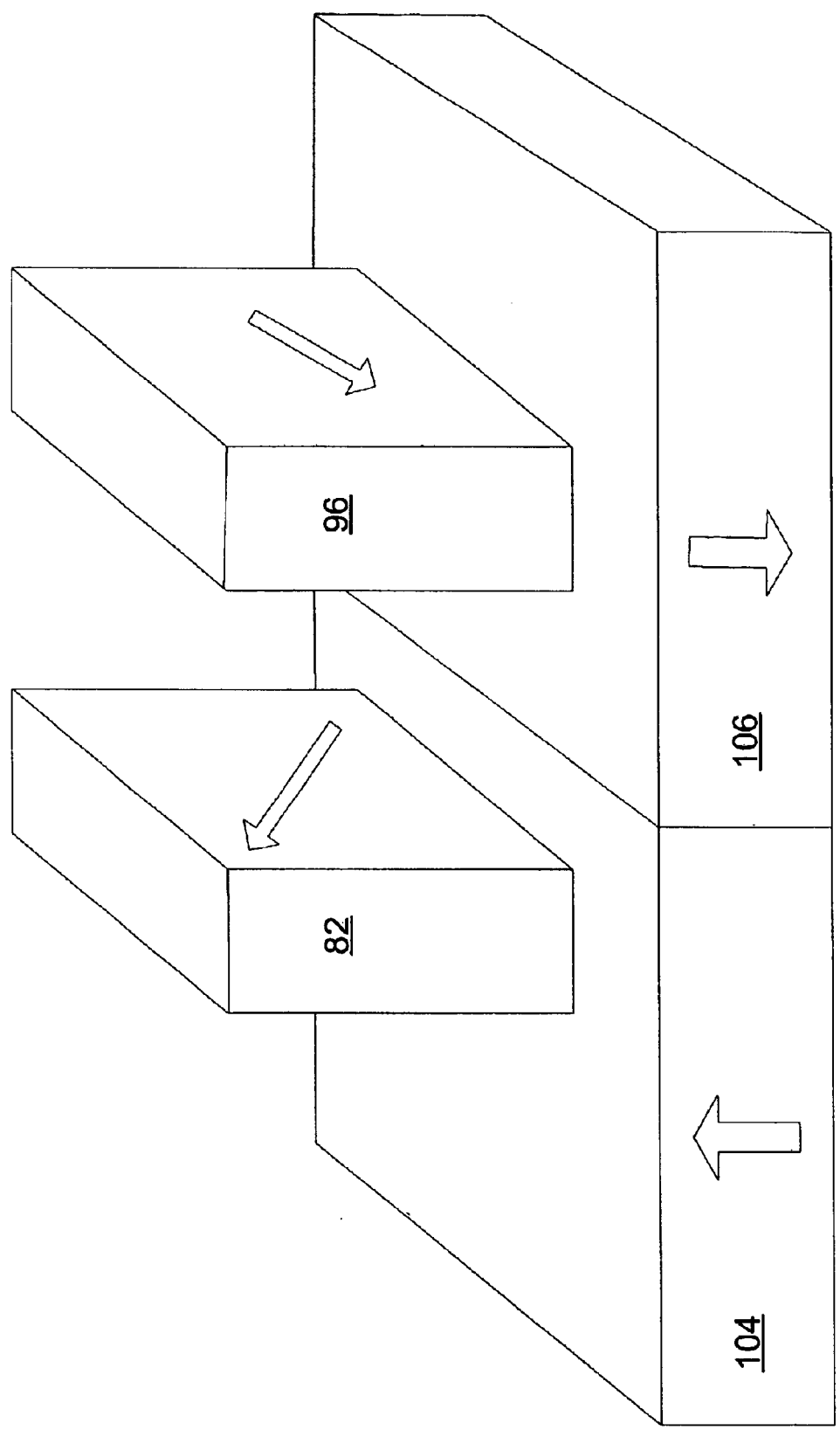
FIG. 5 is a schematic view of only the free layers of the differential GMR read element of FIG. 2, shown under the influence of a portion of a perpendicularly-recorded media in which the magnetic fields in the regions of each free layer are in opposite directions.
Figure 6:
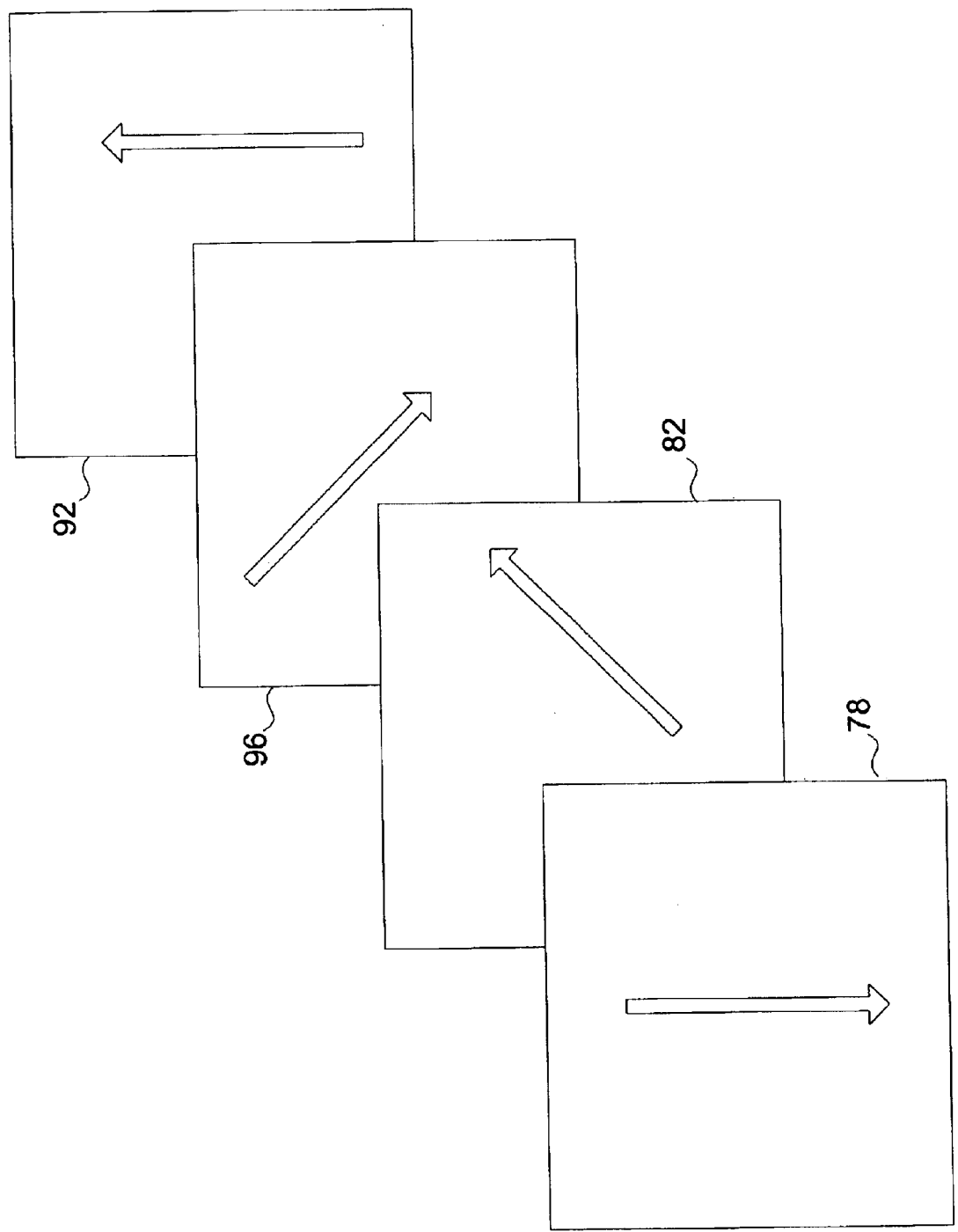
FIG. 6 is a schematic view of only the free layers and the next adjacent pinned layers in the differential GMR read element of FIG. 2, shown in the condition of FIG. 5.

Referring to FIGS. 5 and 6, it can be appreciated that when one of the spin valves is adjacent to the first section 104 of the media 102 and the other spin valve is adjacent to the second section 106 of the media 102, a different result will occur. In this case, the free layer 82 of the top spin valve 62 is shown adjacent to the first section 104 and its magnetization direction is shown tilted upward. The free layer 96 of the bottom synthetic spin valve 64 is shown adjacent to the second section 106, where the downwardly directed magnetic field in the media 102 causes the magnetic direction of the free layer 96 to tilt downward. In this case, the magnetization of each of the fee layers 82 and 96 has rotated in a direction that is closer to anti-parallel with the magnetization of its adjacent pinned layer, which increases the resistance for each of the spin valves 62 and 64. The increase in resistance of each of the spin valves increases the overall resistance of the GMR sensor 56 and a voltage developed thereacross by current I can be sensed to have increased significantly. In this manner, the transition between the two sections 104 and 106 of the magnetically recorded media 102 can be differentially sensed. It should be noted that while this embodiment has described the use of perpendicularly recorded media, the present invention is also equally applicable to longitudinally recorded media.

There is a magnetostatic effect that cooperates with or accentuates the differential action of the two adjacent spin valves 62 and 64. This occurs because the isolation layer 66 is not sufficient to prevent some magnetostatic coupling between the two free layers 82 and 96. Because of this coupling, the magnetization directions of the two free layers 82 and 96 would prefer to be anti-parallel to each other if they were free of other forces such as external magnetic fields and biasing fields. When the two spin valves 62 and 64 experience different magnetic fields due to a transition in the adjacent magnetically recorded media 102, this differential anti-parallel rotation effect makes it very easy for the magnetization directions of the two free layers 82 and 96 to rotate relative to each other toward positions that are not parallel to each other.

Figure 7:
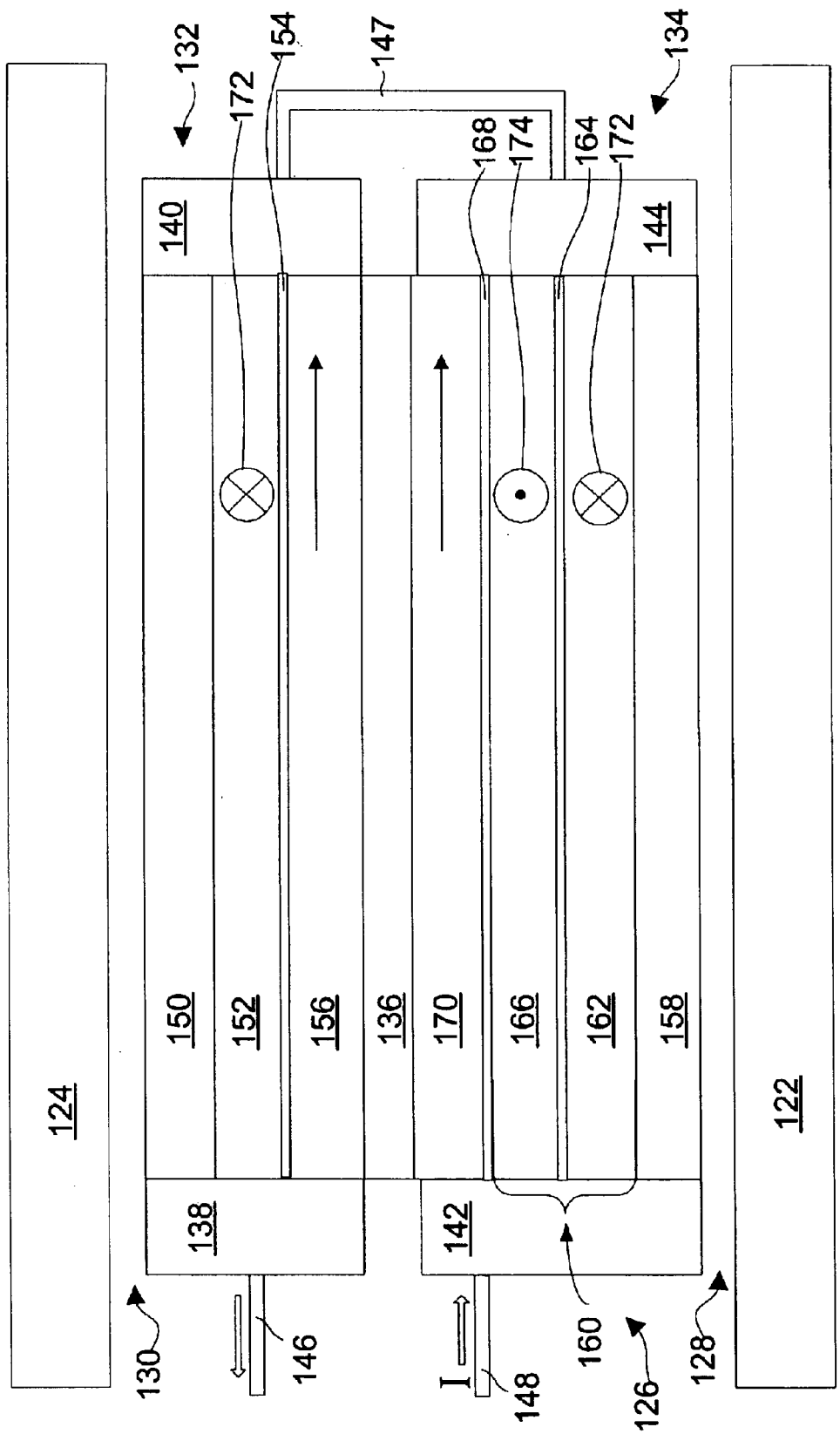
FIG. 7 is a schematic view of a differential GMR read element of the present invention, shown in a series arrangement.

FIG. 7 illustrates an alternative embodiment of a read element 120 that may be part of the head on the slider 32. As can be seen, the read element 120 includes a bottom shield 122 and a top shield 124. A series, differential GMR sensor 126 is located between the shields 122 and 124, spaced apart therefrom by a first read gap 128 and a second read gap 130, respectively. The sensor 126 includes a top spin valve 132 and a bottom synthetic spin valve 134 that are separated from each other by an isolation layer 136. The sensor 126 also includes a pair of electrical contacts 138 and 140 that are located on opposite sides of the top spin valve 132 and a pair of electrical contacts 142 and 144 that are located on opposite sides of the bottom synthetic spin valve 134. A pair of conductors 146 and 148 are electrically connected to the electrical contacts 142 and 138, respectively, to carry a current I to and from the sensor 126. Another conductor 147 is employed to carry current between the two spin valves 132 and 134.

The top spin valve 132 includes a pinning layer 150 that may be composed of platinum manganese (PtMn). Adjacent to the pinning layer 150 is a pinned layer 152 that may be composed of cobalt iron (CoFe). Adjacent to the pinned layer 152 is a narrow conductive spacer layer 154 that may be composed of copper (Cu). Adjacent to the conductive spacer layer 154 is a free layer 156 that may be composed of CoFe. The isolation layer 136 should electrically and magnetically isolates the two spin valves 132 and 134 from each other. Aluminum oxide ($Al_2O_3$) may be a suitable material.

The bottom synthetic spin valve 134 includes a pinning layer 158 that may be composed of PtMn. Adjacent to the pinning layer 158 is a synthetic pinned "layer" 160 that includes a first pinned layer 162, an antiferromagnetic layer 164 that is composed of a material such as ruthenium (Ru), and a second pinned layer 166. On top of the synthetic pinned "layer" 160 adjacent to the second pinned layer 166 is a conductive spacer layer 168 that may be composed of copper. Adjacent to the conductive spacer layer 168 is a free layer 170.

The series sensor 126 can be annealed in a similar manner as that described above for the parallel sensor 56 to pin the pinned layers in the same fashion. The primary differences between the sensors 56 and 126 relate to the way in which they are electrically connected together. Since the sensor 126 is connected together in series, there will still be little to no change in resistance when the two free layers experience the same magnetic field. When they experience magnetic fields in different directions, however, the resistance of each spin valve will change in the same direction. This will result in the change in the combined resistance being twice the change in either of the spin valves alone, which in turn means that the output signal is doubled, or that the sensor 126 can provide twice the output of non-differential sensors.

The read element 120 having the series differential GMR sensor 126 is illustrated and described as a two-terminal device. It can be appreciated however, that the element 120 could be very simply modified to be a three- or four-terminal device, as may be desired. For example, conductor 147 could be connected to an external terminal on the read element 120 and attached to ground, making it a three-terminal device. In this case, two different currents could be applied to conductors 146 and 148, respectively, and the voltage across the top spin valve 132 and bottom synthetic spin valve 134 could be sensed separately. This voltage signal, which is proportional to the resistance, could then be summed to provide the total output signal that varies in a differential manner as described above. Similarly, the conductor 147 could be changed from a conductor that connects the top spin valve 132 to the bottom synthetic spin valve 134 into two entirely separate conductors that are each externally-terminated, making it a four-terminal device. In this manner, separate currents could be driven through the top spin valve 132 and bottom synthetic spin valve 134 in an entirely independently manner and the signals combined to provide a total output signal. As can be appreciated, with three- and four-terminal devices as described, a variety of different combinations of circuitry could be provided.

Figure 8:
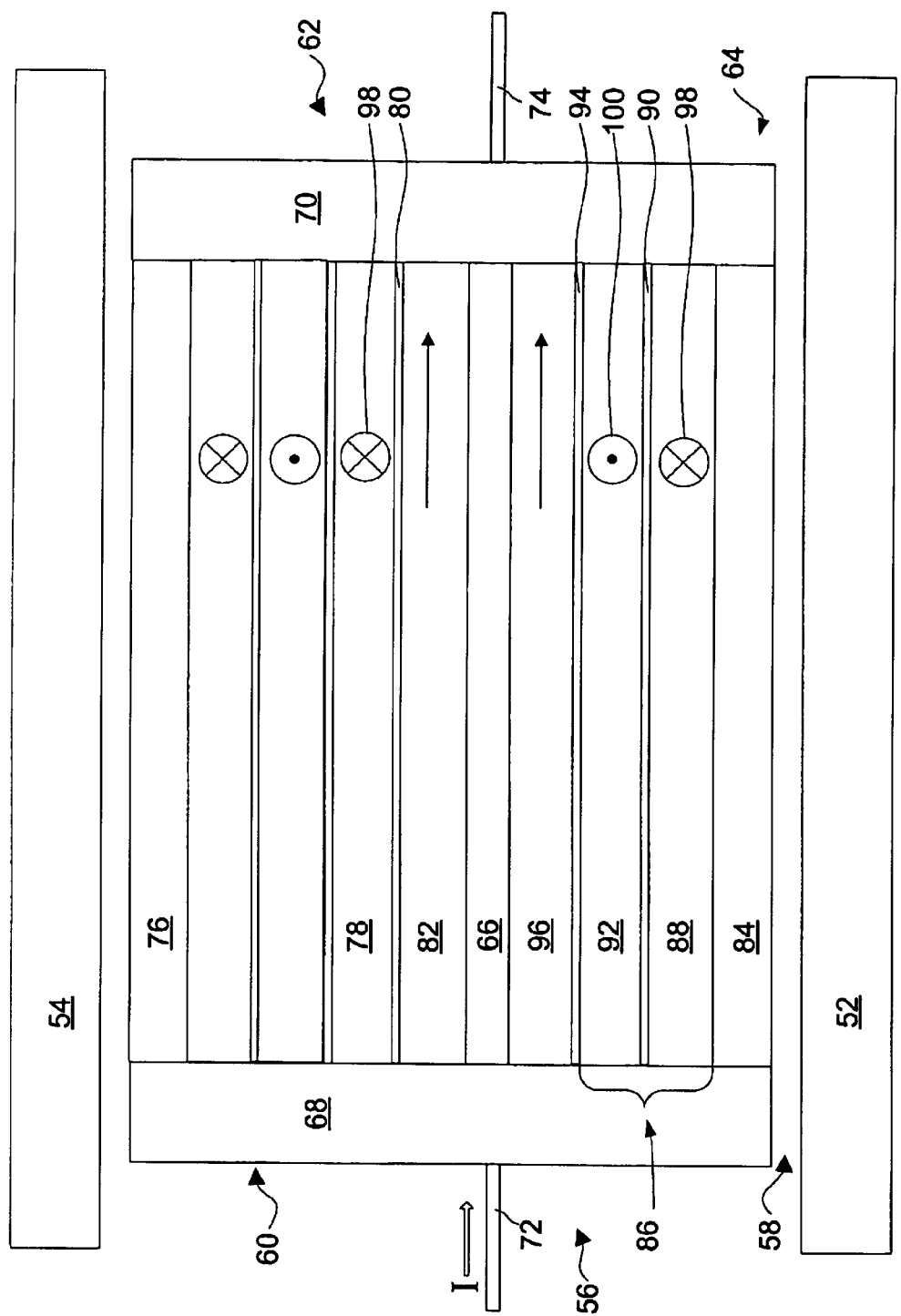
FIG. 8 is a schematic view of a differential GMR read element of the present invention, showing two synthetic spin valves, one having two pinned layers and one having three pinned layers.

While differential GMR sensors 56 and 126 have been described having a bottom spin valve that is synthetic and a top spin valve that is not synthetic, the present invention also applies to any other arrangement that allows the free layers of the two spin valves to have magnetic directions pointing in the same direction while the pinned layer most adjacent to the free layer for each of the two spin valves have magnetization directions that are anti-parallel. For example, a simple modification would be to have the synthetic spin valve as the top spin valve and the non-synthetic spin valve as the bottom spin valve. Further, it is also possible to employ two synthetic spin valves, one for the bottom and one for the top, as long as the above condition is met. One example of this would be a bottom synthetic spin valve having a synthetic pinned "layer" having two separate pinned layers as shown in FIG. 2, and a top spin valve having a synthetic pinned "layer" having three pinned layers (such as is shown in FIG. 8). As can be appreciated, as long as the number of pinned layers in one of the spin valves is an even number and the number of pinned layers in the other spin valve is an odd number, the above-described condition will be met. An alternative condition is that the present invention applies to any combination of non-synthetic or synthetic spin values where the pinning field is in the same parallel direction for each spin valve, but the pinned layer adjacent to the free layer in one spin valve is anti-parallel to the pinned layer adjacent to the free layer in the other spin valve. All possible combinations of non-synthetic and synthetic spin valves that meet either or both of these conditions are contemplated and covered by the present invention.

While the isolation layer 66 of the parallel, differential GMR sensor 56 could be somewhat electrically conductive, it is important that the isolation layer 136 of the series, differential GMR sensor 126 be a good electrical insulator. Accordingly, $Al_2O_3$ is a much better material in the series, differential GMR sensor 126 than Ta.

In the series, differential GMR sensor 126, perfectly matched spin valves 132 and 134 should produce no change in resistance or output signal when exposed to the same magnetic field (e.g., away from a transition). Even if the spin valves are not perfectly matched and a fairly small signal is produced thereby, the signal is of sufficiently low frequency as to not be a problem and cause additional noise to the system. Furthermore, should it be necessary or desirable, it would be possible to compensate electronically for this slight difference between the two spin valves by having two separate current sources, amplifiers, gains, and so forth.

Although, there is mention previously of permanent magnet abutted junctions to provide a magnetization direction for the free layer, exchange bias could be used as well.

It can be appreciated that while each of the parallel and series sensors 56 and 126 are an improvement over the prior art, the parallel sensor 56 may be easier to manufacture with current processes since it is most similar to current devices, while the series sensor 126 provides a larger improvement over the prior art than does the parallel sensor 56. With the parallel sensor 56, the overall resistance is reduced because of the parallel arrangement so the sensitivity figure of merit ($\delta R/R$) may not be increased for the parallel sensor 56 as much as it is increased with the series sensor 126. For the series sensor 126, $\delta R/R$ appears to double the output over a non-differential sensor. There is a gain in signal to noise ratio for both the parallel sensor 56 and the series sensor 126.

Other advantages of the present invention are that the effective read gap is reduced from the range of 50 nanometers or more to an effective read gap in the range of 10 nanometers. This reduced read gap allows for higher areal bit densities, and is thus complementary with perpendicular recording techniques. Furthermore, due to the differential nature of the sensors, they have inherent common mode rejection. In addition, with these sensors the spectral null is doubled, which allows the read density to be doubled as well. Of course, with the reduced read gap there is a narrower $PW_{50}$, as is well known.

Since there is a constant, major push to increase the storage capacity in a given footprint or a disk drive and thus areal bit densities are constantly being increased, the goal or intent is that these gains in sensitivity and signal to noise ratio will compensate for a loss of SNR due to smaller read gap and increased BPI.

Another advantage of the present invention relates to thermal noise. As the components in the read element get smaller, they tend to experience a greater effect from thermal noise. Using differential spin valves helps to stabilize this effect due to the coupling between the spin valves which tends to reduce the thermal noise. Lastly, by having two spin valves, the read element will have increased ESD (electrostatic discharge) robustness since there is more volume to the two spin valves as compared to one.

The foregoing description of the present invention has been presented for purposes of illustration and description. Furthermore, the description is not intended to limit the invention to the form disclosed herein. Consequently, variations and modifications commensurate with the above teachings, and skill and knowledge of the relevant art, are within the scope of the present invention. The embodiments described hereinabove are further intended to explain best modes known of practicing the invention and to enable others skilled in the art to utilize the invention in such, or other embodiments and with various modifications required by the particular application(s) or use(s) of the present invention. It is intended that the appended claims be construed to include alternative embodiments to the extent permitted by the prior art.

What is claimed is:

1. A GMR read element for reading magnetically recorded data from adjacent magnetic storage media, comprising:

a first synthetic spin valve having a conductive spacer layer, a free layer on one side thereof, and a pinned layer on an opposite side thereof; and a second synthetic spin valve having a conductive spacer layer, a free layer on one side thereof, and a pinned layer on an opposite side thereof;

wherein the free layers of the first and second spin valves have magnetization directions in the absence of any magnetic field from the adjacent magnetic storage media that are parallel to each other;

wherein the pinned layers of the first and second spin valves have magnetization directions that are antiparallel to each other; and wherein one of the synthetic spin valves has an even number of pinned layers therein and the other of the synthetic spin valves has an odd number of pinned layers therein.

2. A GMR read element for reading magnetically recorded data from adjacent magnetic storage media, comprising:

a first spin valve having a conductive spacer layer, a free layer on one side thereof, and a pinned layer on an opposite side thereof; and a second spin valve having a conductive spacer layer, a free layer on one side thereof, and a pinned layer on an opposite side thereof;

wherein the free layers of the first and second spin valves have magnetization directions in the absence of any magnetic field from the adjacent magnetic storage media that are parallel to each other;

wherein the pinned layers of the first and second spin valves have magnetization directions that are antiparallel to each other; and wherein a single annealing process is used to set the directions of the pinned layers.

3. A GMR read element for reading magnetically recorded data from adjacent magnetic storage media, comprising:

a first GMR read sensor that is a synthetic spin valve having a free layer and having a resistance to electrical current that varies with magnetic fields from the adjacent magnetic storage media;

a second GMR read sensor that is a synthetic spin valve having a free layer and having a resistance to electrical current that varies with magnetic fields from the adjacent magnetic storage media;

an isolation layer located between the first and second GMR read sensors;

wherein the free layers of the first and second GMR read sensors have magnetization directions in the absence of any magnetic field from the adjacent magnetic storage media that are parallel to each other;

wherein the resistances of the first and second GMR read sensors vary in opposite directions when both of the sensors experience the same magnetic field from the adjacent magnetic storage media and the resistances vary in the same direction when the sensors experience magnetic fields from the adjacent magnetic storage media that are of opposite direction; and wherein one of the synthetic spin valves has an even number of pinned layers therein and the other of the synthetic spin valves has an odd number of pinned layers therein.

4. A GMR read element for reading magnetically recorded data from adjacent magnetic storage media, comprising:

a first GMR read sensor having a free layer and having a resistance to electrical current that varies with magnetic fields from the adjacent magnetic storage media;

a second GMR read sensor having a free layer and having a resistance to electrical current that varies with magnetic fields from the adjacent magnetic storage media;

an isolation layer located between the first and second GMR read sensors;

wherein the free layers of the first and second GMR read sensors have magnetization directions in the absence of any magnetic field from the adjacent magnetic storage media that are parallel to each other;

wherein the resistances of the first and second GMR read sensors vary in opposite directions when both of the sensors experience the same magnetic field from the adjacent magnetic storage media and the resistances vary in the same direction when the sensors experience magnetic fields from the adjacent magnetic storage media that are of opposite direction; and wherein a single annealing process is used to set the directions of the pinned layers.

5. A GMR read element for reading magnetically recorded data from adjacent magnetic storage media, comprising:

a first GMR read sensor that is a synthetic spin valve having a conductive spacer layer, a free layer on one side thereof, and a pinned layer on an opposite side thereof and having a resistance to electrical current that varies with magnetic fields from the adjacent magnetic storage media;

a second GMR read sensor that is a synthetic spin valve having a conductive spacer layer, a free layer on one side thereof, and a pinned layer on an opposite side thereof and having a resistance to electrical current that varies with magnetic fields from the adjacent magnetic storage media;

an isolation layer located between the first and second GMR read sensors;

wherein the pinned layers of the first and second GMR read sensors have magnetization directions that are anti-parallel to each other;

wherein the resistances of the first and second GMR read sensors vary in opposite directions when both of the sensors experience the same magnetic field from the adjacent magnetic storage media and the resistances vary in the same direction when the sensors experience magnetic fields from the adjacent magnetic storage media that are of opposite direction; and wherein one of the synthetic spin valves has an even number of pinned layers therein and the other of the synthetic spin valves has an odd number of pinned layers therein.

6. A GMR read element for reading magnetically recorded data from adjacent magnetic storage media, comprising:

a first GMR read sensor having a conductive spacer layer, a free layer on one side thereof, and a pinned layer on an opposite side thereof and having a resistance to electrical current that varies with magnetic fields from the adjacent magnetic storage media;

a second GMR read sensor having a conductive spacer layer, a free layer on one side thereof, and a pinned layer on an opposite side thereof and having a resistance to electrical current that varies with magnetic fields from the adjacent magnetic storage media;

an isolation layer located between the first and second GMR read sensors;

wherein the pinned layers of the first and second GMR read sensors have magnetization directions that are anti-parallel to each other;

wherein the resistances of the first and second GMR read sensors vary in opposite directions when both of the sensors experience the same magnetic field from the adjacent magnetic storage media and the resistances vary in the same direction when the sensors experience magnetic fields from the adjacent magnetic storage media that are of opposite direction; and wherein a single annealing process is used to set the directions of the pinned layers.

7. A GMR read element for reading magnetically recorded data from adjacent magnetic storage media, comprising:

a first GMR read sensor that is a synthetic spin valve having a free layer and having a resistance to electrical current that varies with magnetic fields from the adjacent magnetic storage media;

a second GMR read sensor that is a synthetic spin valve having a free layer and having a resistance to electrical current that varies with magnetic fields from the adjacent magnetic storage media;

an isolation layer located between the first and second GMR read sensors;

wherein the free layers of the first and second GMR read sensors have magnetization directions in the absence of any magnetic field from the adjacent magnetic storage media that are parallel to each other;

wherein the GMR read sensors operate differentially; and wherein one of the synthetic spin valves has an even number of pinned layers therein and the other of the synthetic spin valves has an odd number of pinned layers therein.

8. A GMR read element for reading magnetically recorded data from adjacent magnetic storage media, comprising:

a first GMR read sensor having a free layer and having a resistance to electrical current that varies with magnetic fields from the adjacent magnetic storage media;

a second GMR read sensor having a free layer and having a resistance to electrical current that varies with magnetic fields from the adjacent magnetic storage media;

an isolation layer located between the first and second GMR read sensors;

wherein the free layers of the first and second GMR read sensors have magnetization directions in the absence of any magnetic field from the adjacent magnetic storage media that are parallel to each other;

wherein the GMR read sensors operate differentially; and wherein a single annealing process is used to set the directions of the pinned layers.

* * * * *